United States Patent [19]

Tsujimura et al.

[11] Patent Number: 4,808,045
[45] Date of Patent: Feb. 28, 1989

[54] END MILL WITH THROW-AWAY TIP

[75] Inventors: Osamu Tsujimura; Takayoshi Saito; Tatsuo Arai; Yasuzo Funaki, all of Shinagawa, Japan

[73] Assignee: Mitsubishi Kinzoku Kabushiki Kaisha, Tokyo, Japan

[21] Appl. No.: 266,339

[22] Filed: Jun. 23, 1987

Related U.S. Application Data

[63] Continuation-in-part of Ser. No. 815,055, Dec. 31, 1985, Pat. No. 4,693,641.

[30] Foreign Application Priority Data

| Oct. 25, 1985 | [JP] | Japan | 60-163962 |
| Oct. 25, 1985 | [JP] | Japan | 60-163963 |
| Nov. 6, 1985  | [JP] | Japan | 60-170488 |
| Jul. 29, 1986 | [JP] | Japan | 61-178553 |

[51] Int. Cl.$^4$ .................................................. B23B 51/00
[52] U.S. Cl. .................................... 408/204; 408/207; 407/42; 407/61
[58] Field of Search ............ 407/34, 42, 53, 54, 407/113, 114, 115, 116, 36; 408/186, 199, 713, 224, 203.5, 204, 205, 206, 207, 14

[56] References Cited

U.S. PATENT DOCUMENTS 4,529,329 7/1985 Shimomura .................. 407/114

FOREIGN PATENT DOCUMENTS 2012735 6/1981 Fed. Rep. of Germany .

Primary Examiner—Frederick R. Schmidt
Assistant Examiner—Blynn Shideler
Attorney, Agent, or Firm—Cushman, Darby & Cushman

[57] ABSTRACT

An end mill includes a body having a core receiving recess and a cutting insert releasably mounted thereon. An upper surface of the insert has a first cutting edge ridge serving as an outer peripheral cutting edge, a second cutting edge ridge providing an end cutting edge and a third cutting edge ridge providing an inner peripheral cutting edge. The upper surface has a corner where the second and third cutting edge ridge intersecting each other. The upper surface is composed of a central portion and a corner portion including the corner, whereby the third cutting edge ridge comprising a first edge portion defined by a ridge of the corner portion and a second edge portion defined by a ridge of the central portion. At least that portion of the corner portion disposed adjacent the central portion is inclined providing a thickness of the insert is progressively reduced toward the corner. The insert has a negative radial rake at the outer peripheral cutting edge and a positive axial rake. The second edge portion extends radially outwardly of the body and in a direction opposite to the direction of rotation of the body from that point where the first and second edge portions intersect. The distance between the corner and the axis is longer than between the axis and a point at which a line extending radially outwardly of the body from the axis and a line on which a corner ridge lies cross at right angles.

13 Claims, 17 Drawing Sheets

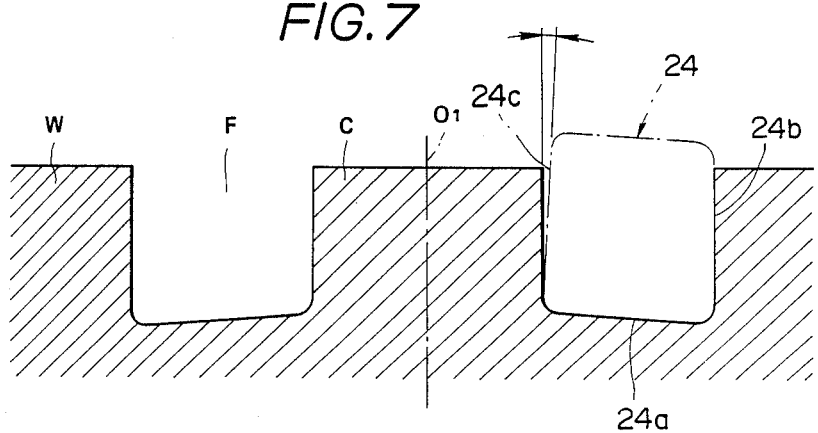
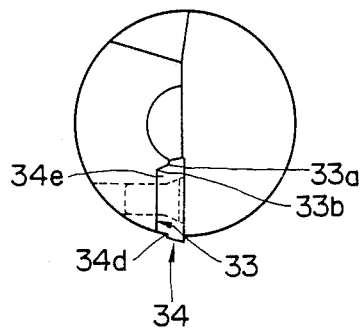
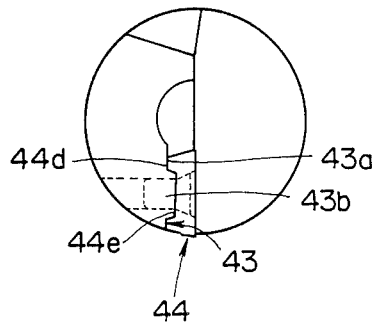
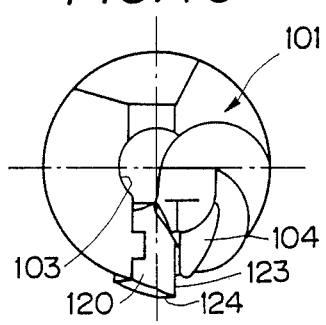
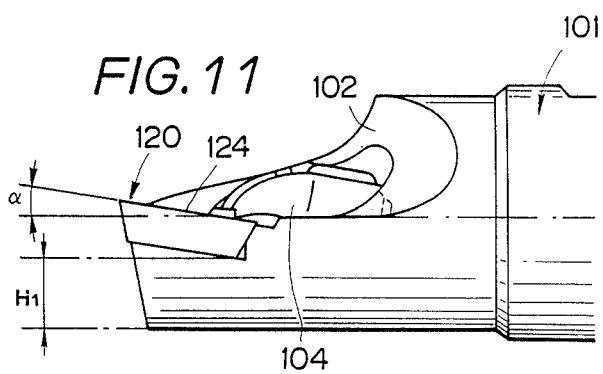

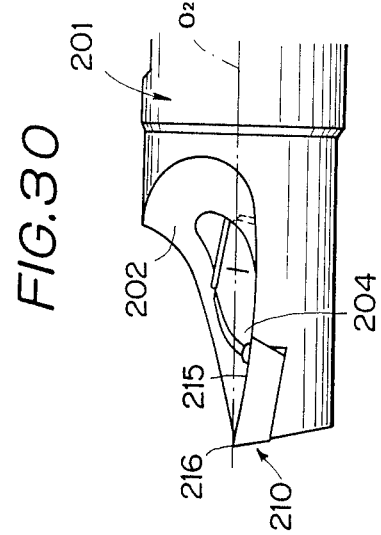
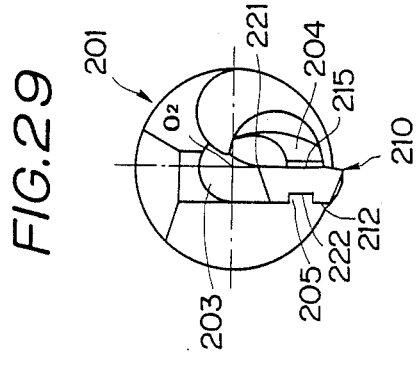
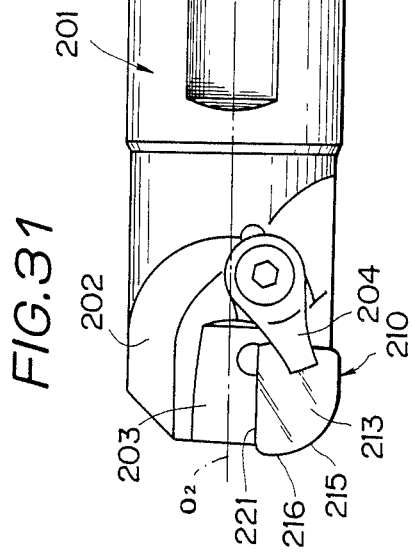

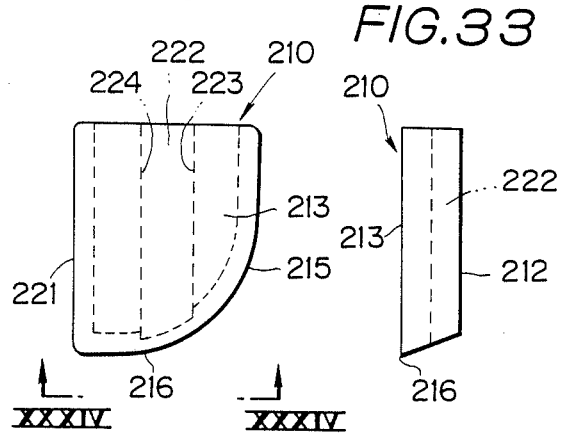
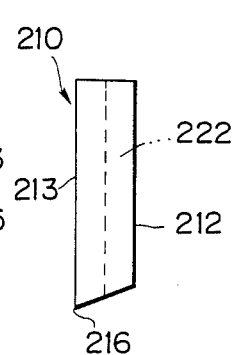
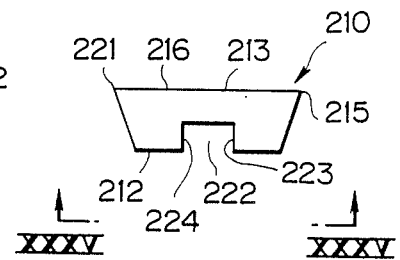
FIG.32    FIG.33    FIG.34
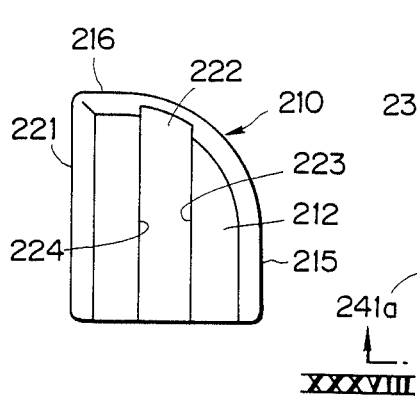
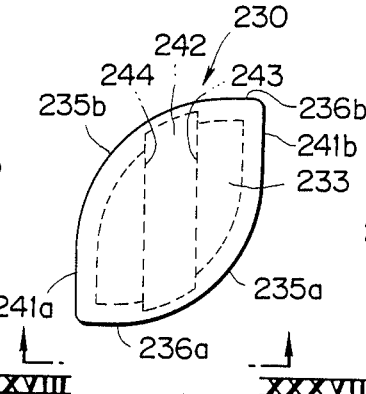
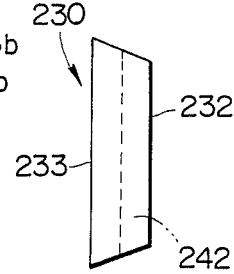
FIG.35    FIG.36    FIG.37
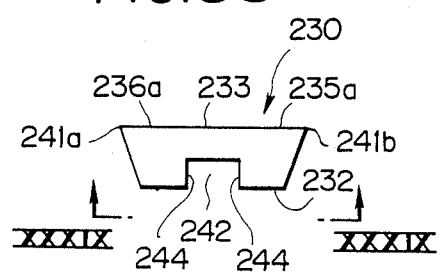
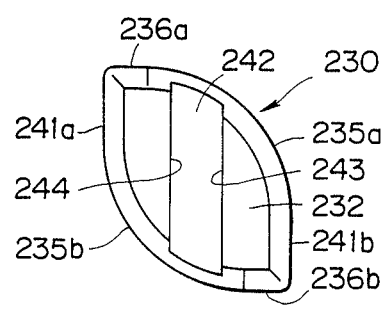
FIG.38    FIG.39

END MILL WITH THROW-AWAY TIP

CROSS-REFERENCE TO RELATED APPLICATION

This is a continuation-in-part of our application Ser. No. 815,055 filed Dec. 31, 1985 now U.S. Pat. No. 4,693,641.

BACKGROUND OF THE INVENTION

1. Field of the Invention

The present invention relates to an end mill which is capable of performing an axial cutting and a cross feed cutting with a throw-away tip mounted on a forward end of an end mill body.

2. Related Art Statement

FIGS. 1 and 2 of the accompanying drawings show an example of a conventional end mill in which a single throwaway tip or cutting insert is mounted on a forward end of an end mill body 1. The end mill shown in FIGS. 1 and 2 is arranged such that a cutting insert 2 of a square shape is detachably mounted on a forward end of the end mill body 1. A cutting edge ridge of the insert 2 located at a forward end thereof and extending from an outer peripheral side of the end mill body 1 toward an inner peripheral side thereof forms an end cutting edge 2a, and a cutting edge ridge extending from an outer end of the end cutting edge 2a toward a rearward end of the end mill body 1 in the direction of an axis O forms a peripheral cutting edge 2b.

In the end mill described above, the end cutting edge 2a is formed in spaced or offset relation to the axis O, as clearly seen from FIG. 1. This, when an axial cutting is performed on a workpiece, would cause a columnar core, which is a portion of the workpiece remaining uncut, to be formed at a center of rotation, and the core would impinge against the insert 2. Accordingly, the end mill has an inconvenience that it would be incapable of performing the axial cutting.

FIGS. 3 and 4 show another example of a conventional end mill in which an end cutting edge 12a of a cutting insert 12 is formed so as to extend across an axis O of an end mill body. With such insert 12, no core would be formed at a center of rotation, and it would be possible to perform both an axial cutting and a cross feed cutting.

In the end mill illustrated in FIGS. 3 and 4, however, a cutting speed at a portion of the end cutting edge 12a located adjacent the axis O is extremely low, and furthermore, when the axial cutting is performed, an excessive thrust load is exerted on the portion of the end cutting edge 12a. This would cause a problem that the portion of the end cutting edge 12a adjacent the axis O is chipped or fractured. In addition, since the end cutting edge 12a is formed so as to extend across the axis O, the diameter of the end mill is subjected to restriction by the size of the insert 12. In other words, a problem would occur that if the end mill is desired to have an increased diameter, the insert 12 must also have an increased size.

SUMMARY OF THE INVENTION

An object of the present invention is to provide an end mill capable of performing an axial cutting and a cross feed cutting with a cutting insert, by means of which problems can be solved that a portion of an end cutting edge adjacent an axis of an end mill body is chipped or fractured and that the insert having an increased size is required to be utilized with an increase in diameter of the end mill body.

Another object of the present invention is to provide a cutting insert which can be suitably employed for such an end mill.

A general feature of the end mill in accordance with the present invention lies in the provision of a cutting insert having an inner peripheral cutting edge for cutting a core. When the insert having an inner peripheral cutting edge is employed, a larger cutting load is to be exerted on an end mill body and the insert during cutting operation. Accordingly, the insert should preferably be mounted on the end mill body as firmly as possible, and the end mill body should preferably have a greater rigidity. In view of these, a specific feature of the end mill in accordance with the present invention resides in a provision of effective means for preventing the insert from shifting during cutting operation. Another specific feature of the end mill in accordance with the present invention resides in a special configuration of the insert by which a sufficient amount of a back metal is ensured in the end mill body.

Further objects, features and advantages of the present invention, together with the organization and manner of operation thereof, will become apparent from the following detailed description of the invention.

BRIEF DESCRIPTION OF THE DRAWINGS

FIG. 7 is a cross-sectional view illustrating a workpiece on which an axial cutting is performed by the end mill shown in FIGS. 5 and 6;

FIG. 8 is a view similar to FIG. 5, but showing a second embodiment of the present invention;

FIG. 9 is a view similar to FIG. 5, but showing a third embodiment of the present invention;

FIG. 10 is a view similar to FIG. 5, but showing a fourth embodiment of the present invention;

FIG. 11 is a fragmentary side elevational view of an end mill shown in FIG. 10;

FIG. 29 is a view similar to FIG. 5, but showing a seventh embodiment of the present invention;

FIG. 30 is a fragmentary side elevational view of an end mill shown in FIG. 29;

FIG. 31 is a plan view of the end mill shown in FIG. 29;

FIG. 32 is a plan view of a cutting insert shown in FIGS. 29 through 31;

FIG. 33 is a side elevational view of the insert shown in FIG. 32;

FIG. 34 is a view as seen in the direction indicated by the arrows XXXIV—XXXIV in FIG. 32;

FIG. 35 is a view as seen in the direction indicated by the arrows XXXV—XXXVI in FIG. 34;

FIG. 36 is a plan view of a cutting insert used in an eighth embodiment of the present invention, with an end mill body being omitted;

FIG. 37 is a side elevational view of the insert shown in FIG. 36;

FIG. 38 is a view as seen in the direction indicated by the arrows XXXVIII—XXXVIII in FIG. 36;

FIG. 39 is a view as seen in the direction indicated by the arrows XXXIX—XXXIX in FIG. 38;

DESCRIPTION OF THE PREFERRED EMBODIMENTS OF THE INVENTION

Figure 1:
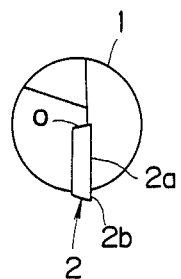
FIG. 1 is an end view of a conventional end mill having mounted thereon a cutting insert.
Figure 2:
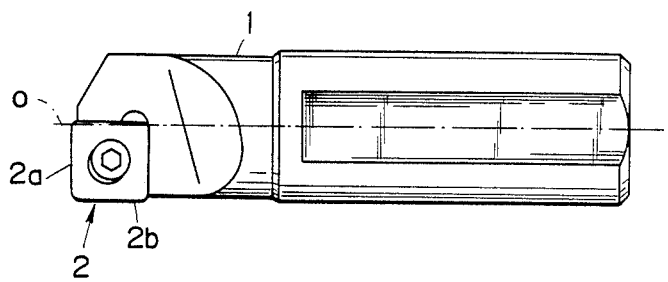
FIG. 2 is a plan view of the end mill shown in FIG. 1.
Figure 3:
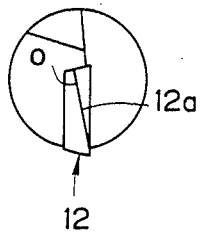
FIG. 3 is an end view of another conventional end mill.
Figure 4:
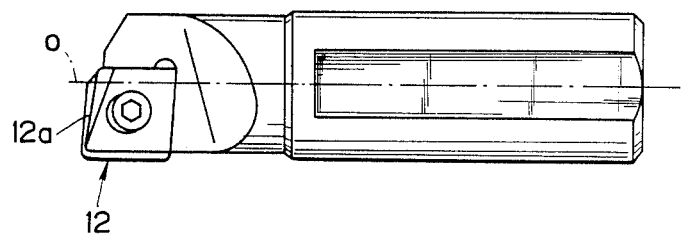
FIG. 4 is a plan view of the end mill shown in FIG. 3.
Figure 5:
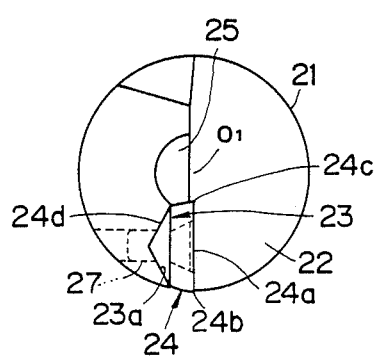
FIG. 5 is an end view of an end mill in accordance with a first embodiment of the present invention.
Figure 6:
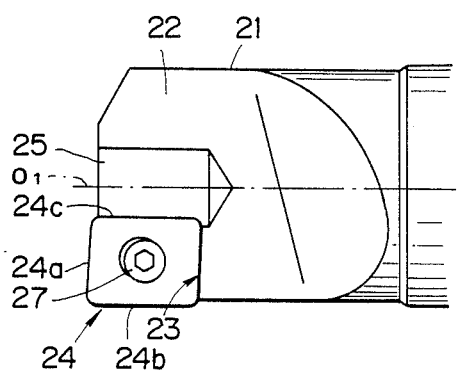
FIG. 6 is a fragmentary plan view of the end mill shown in FIG. 5.
Figure 12:
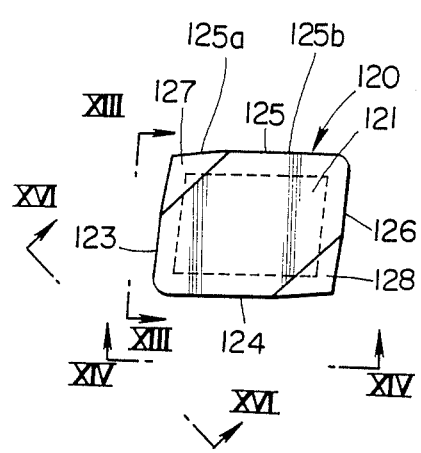
FIG. 12 is a plan view of a cutting insert shown in FIGS. 10 and 11.
Figure 13:
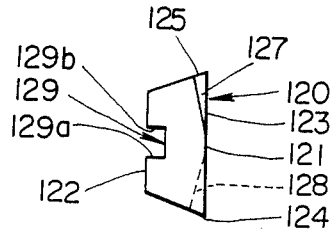
FIG. 13 is a view as seen in the direction indicated by the arrows XIII—XIII in FIG. 12.
Figure 14:
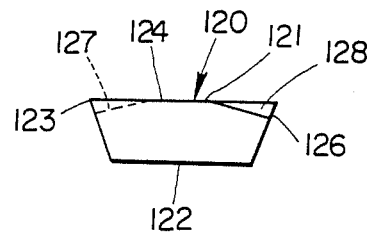
FIG. 14 is a view as seen in the direction indicated by the arrows XIV—XIV in FIG. 12.
Figure 15:
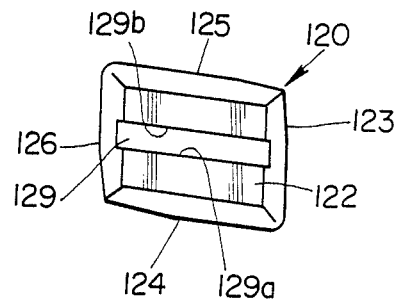
FIG. 15 is a bottom view of the insert shown in FIG. 12.
Figure 16:
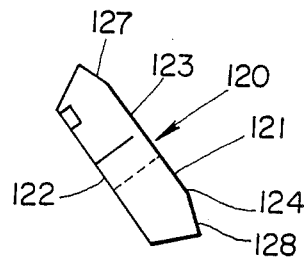
FIG. 16 is a view as seen in the direction indicated by the arrows XVI—XVI in FIG. 12.

FIGS. 5 and 6 show an end mill in accordance with a first embodiment of the present invention. The end mill comprises a columnar end mill body 21 having a forward end section thereof an approximately half portion of which is cut away to form a chip pocket 22. An insert receiving recess or insert seat 23 having a V-shaped cross-sectional bottom surface 23a is formed at an outer peripheral portion of a forward end of a wall surface which defines the chip pocket 22. A throw-away tip or cutting insert 24 is detachably secured to the insert seat 23 by a clamping screw 27 in such a manner as to be spaced from an axis $O_1$ of the end mill body 21.

The insert 24 is in the form of a parallelogram, and has four cutting edge ridges of which first one is located adjacent a forward end face of the end mill body 21 and extends from an outer peripheral side of the body 21 toward an inner peripheral side thereof to form an end cutting edge 24a, and second and third ones of which respectively extend from outer and inner peripheral ends of the end cutting edge 24a toward a rearward end of the end mill body 21 in the direction of the axis $O_1$ to form outer and inner peripheral cutting edges 24b and 24c, respectively. The end cutting edge 24a is inclined toward the rearward end of the end mill body 21 as the edge 24a approaches the axis $O_1$. The outer peripheral edge 24b extends in parallel to the axis $O_1$ or is inclined within an extent of approximately 30' toward the axis $O_1$ as the edge 24b approaches the rearward end of the end mill body 21. The inner peripheral edge 24c is inclined toward the axis $O_1$ as the edge 24c approaches the rearward end of the end mill body 21. In addition, in order to prevent the insert 24 from being moved or shifted by a cutting resistance during a cutting operation of the end mill, the insert 24 has a lower surface 24d which is formed into a V-shaped cross-section complementary to the bottom surface 23a of the insert seat 23. Additionally, the insert 24 has a radial rake angle set to 0 to 5 degrees, and an axial rake angle set to 5 to 10 degrees.

A core receiving recess 25 is formed at a center of the forward end face of the end mill body 21 so as to extend in the direction of the axis $O_1$. The core receiving recess 25 is provided for receiving therein a core formed on a workpiece due to the fact that the insert 24 is spaced from the axis $O_1$. The recess 25 is formed into a semicircular shape, because the approximately half portion is cut away from the forward end section of the end mill body 21. A distance from the axis $O_1$ to a wall surface of the core receiving recess 25, i.e., a radius of the recess 25 is set to a value equal to or greater than a distance from the axis $O_1$ to the inner peripheral end of the end cutting edge 24a.

When an axial cutting is performed by the end mill described above, an annular groove F is cut and formed in a workpiece W by the end cutting edge 24a of the insert 24, as shown in FIG. 7. This causes a core C to be formed at a center of rotation, which core has a radius equal to the distance from the axis $O_1$ to the inner peripheral end of the end cutting edge 24a. The core C is progressively grown as the end mill is fed axially, and is received in the recess 25. Subsequently, the core C is cut away by the inner peripheral cutting edge 24c when a cross feed cutting is performed by the end mill. It is needless to say that in case where a mere cross feed cutting is performed, the cutting operation is performed by the outer peripheral cutting edge 24b.

FIG. 8 shows an end mill in accordance with a second embodiment of the present invention, in which description of parts or components similar to those of the end mill shown in FIGS. 5 and 6 will be omitted to avoid duplication. An end mill body of the end mill has a concave portion or recess 33b formed in a bottom surface 33a of an insert seat 33, while an insert 34 has a lower surface 34d having formed thereon a convex portion or projection 34e which is snugly fitted in the recess 33b to prevent the insert 34 from being moved or shifted during the cutting operation.

FIG. 9 shows an end mill in accordance with a third embodiment of the invention, in which description of parts or components similar to those of the end mill shown in FIGS. 5 and 6 will be omitted to avoid duplication. An end mill body of the end mill has a convex portion or projection 43b formed on a bottom surface 43a of an insert seat 43, while a cutting insert 44 has a lower surface 44d having formed therein a concave portion or recess 44e in which the projection 43b is snugly fitted to prevent the insert 44 from being moved or shifted during the cutting operation.

FIGS. 10 through 16 show an end mill in accordance with a fourth embodiment of the present invention, which comprises an end mill body 101 having a chip pocket 102 and a core receiving recess 103. The end mill body 101 is substantially similar in structure to the end mill body 21 described previously with reference to FIGS. 5 and 6 and will not be described in detail for simplification. A cutting insert, generally designated by the reference numeral 120, is detachably secured to the end mill body 101 by a clamping member 104.

As shown in detail in FIGS. 12 through 16, the insert 120 is in a form of a plate having an appearance of a parallelogram and has upper and lower surfaces 121 and 122 extending parallel to each other. The lower surface 122 forms a seating surface, and the upper surface 121 has four sides which form cutting edge ridges 123, 124, 125 and 126, respectively. The insert 120 is adapted such that the cutting edge ridge 123 or 126 is utilized as an end cutting edge when the insert 120 is mounted on a forward end of the end mill body 101, and each of the cutting edge ridges 124 and 125 with the cutting edge ridge 123 being positioned therebetween is utilized as an outer or an inner peripheral cutting edge.

The upper surface 121 of the insert 120 has a corner portion 127 defined by the cutting edge ridge 123 and the cutting edge ridge 125 which is utilized as an inner peripheral cutting edge when the cutting edge ridge 123 is utilized as an end cutting edge, and a corner portion 128 diagonally opposed to the corner portion 127. Each of the corner portions 127 and 128 is formed by such an inclined planar surface that a thickness of the insert 120 between the upper and lower surfaces 121 and 122 is progressively reduced from a central portion of the insert 120 toward the extremity of the corner portion 127, 128. Thus, the cutting edge ridge 125 serving as the inner peripheral cutting edge is composed of a first edge portion 125a and a second edge portion 125b. A groove 129 of a channel-shaped cross-section is formed in a central portion of the lower surface 122 of the insert 120 so as to extend along the axis of the end mill body 101. When the insert 120 is mounted on the end mill body 101, the groove 129 receives an elongated projection formed on the surface of the insert seat of the end mill body 101. In this case, side walls of the groove 129 form abutment surfaces 129a and 129b which receive component forces of the cutting feed from the cutting edges 124 and 125, respectively.

As shown in FIG. 11, the insert 120 is attached to the end mill body 101 such that a radial rake angle at the cutting end edge ridge 124 when utilized as an outer peripheral cutting edge is rendered negative, and a positive axial rake angle $\alpha$ is applied to the cutting edge ridge 124, in order to have an increased amount of the back metal $H_1$.

Figure 17:
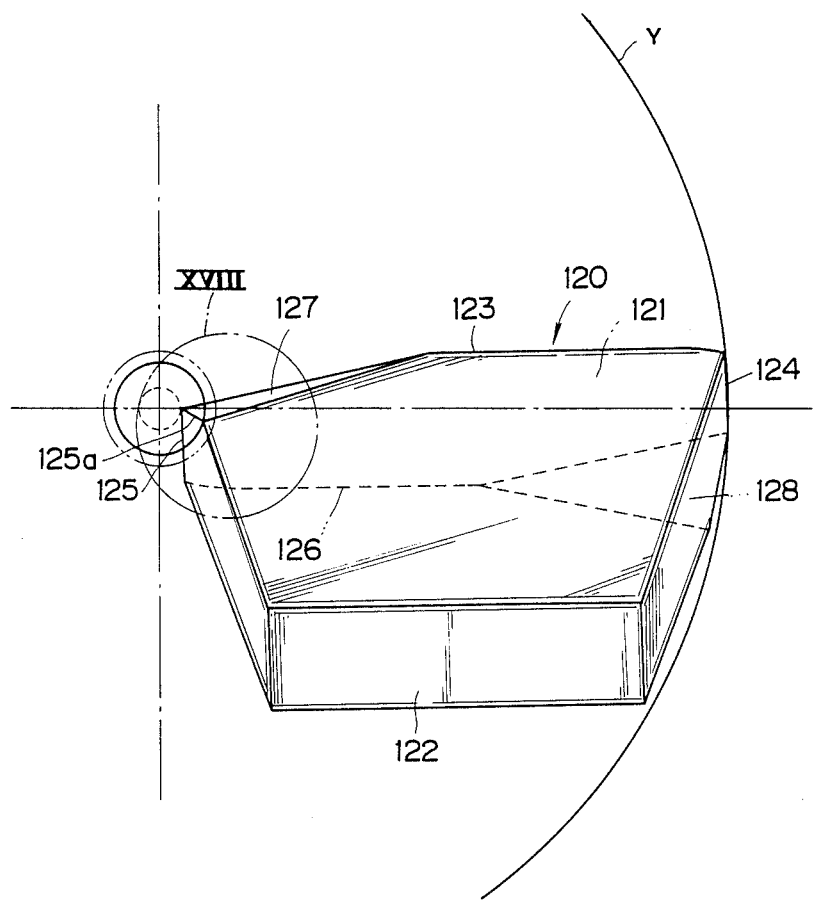
FIG. 17 is a diagrammatical perspective view showing an attached condition of the insert shown in FIG. 12.
Figure 18:
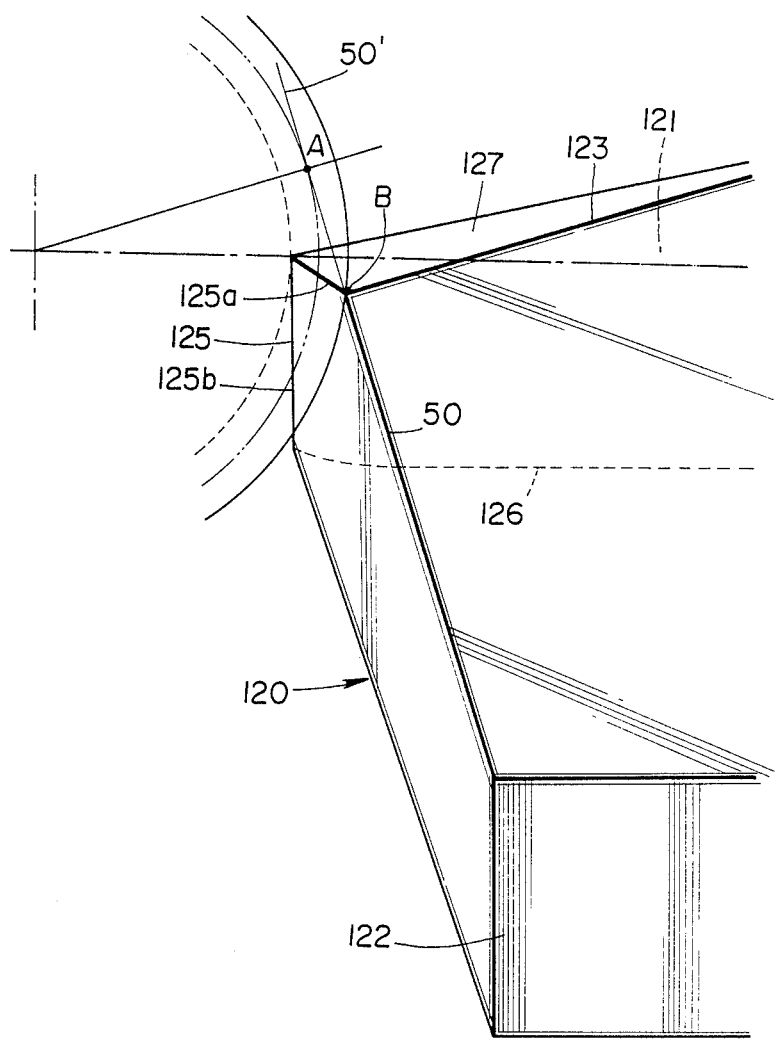
FIG. 18 is an enlarged fragmentary perspective view of a portion encircled by the character XVIII in FIG. 17.
Figure 19:
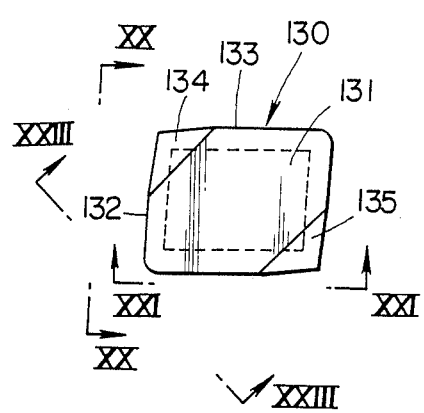
FIG. 19 is a plan view showing a cutting insert used in a fifth embodiment of the present invention, with an end mill body being omitted.
Figure 20:
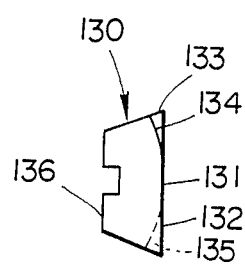
FIG. 20 is a view as seen in the direction indicated by the arrows XX—XX in FIG. 19.
Figure 21:
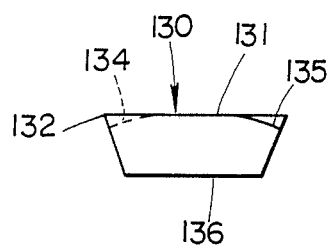
FIG. 21 is a view as seen in the direction indicated by the arrows XXI—XXI in FIG. 19.
Figure 22:
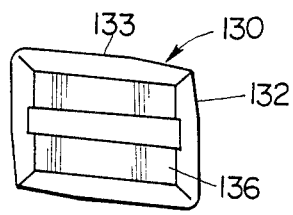
FIG. 22 is a bottom view of the insert shown in FIG. 19.
Figure 23:
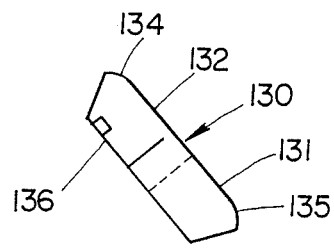
FIG. 23 is a view as seen in the direction indicated by the arrows XXIII—XXIII in FIG. 19.
Figure 24:
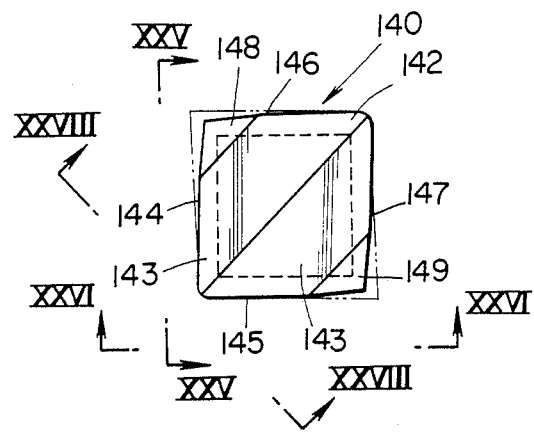
FIG. 24 is a plan view of a cutting insert used in a sixth embodiment of the present invention, with an end mill body being omitted.
Figure 25:
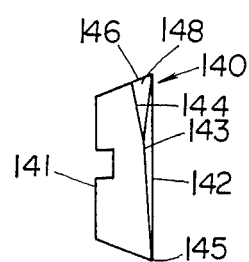
FIG. 25 is a view as seen in the direction indicated by the arrows XXV—XXV in FIG. 24.
Figure 26:
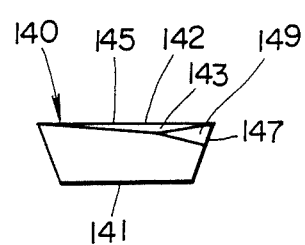
FIG. 26 is a view as seen in the direction indicated by the arrows XXVI—XXVI in FIG. 24.
Figure 27:
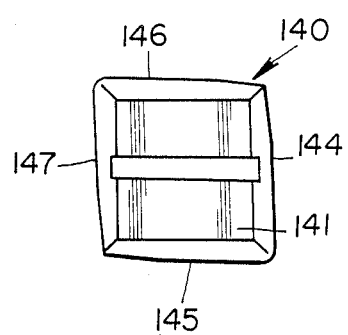
FIG. 27 is a bottom view of the insert shown in FIG. 24.
Figure 28:
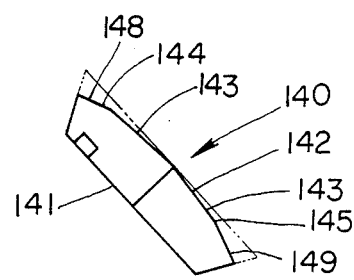
FIG. 28 is a view as seen in the direction indicated by the arrows XXVIII—XXVIII in FIG. 24.

As shown in FIGS. 17 and 18, even in case where the insert 120 having the above-described geometric configuration is mounted on the end mill body 101 such that the cutting edge ridge 124 utilized as an outer peripheral cutting edge is rendered negative, it is possible to restrict the radial rake angle at a forward end portion of the cutting edge ridge 125 utilized as an inner peripheral cutting edge so as not to be increased in the positive direction, because the corner portion 127 of the upper surface 121 adjacent the forward end portion of the cutting edge ridge 125 is formed by the inclined planar surface, so that the cutting edge 125 can be disposed as shown in FIGS. 17 and 18. Namely, suppose a line 50' on which a corner ridge 50 lies, and a point A at which the line 50' and a line extending radially outwardly from the axis of the body cross at right angles. Then, the foremost end of the cutting edge 125, as designated at B, is disposed so as to be farther from the axis than the point A is. In addition, the second edge portion 125b of the cutting edge 125 is disposed so as to extend radially outwardly of the body as well as in the direction opposite to the direction of rotation of the body from that point of the cutting edge 125 at which the first and second edge portions 125a and 125b intersect with each other. Accordingly, should the end mill body 101 have an increased amount of back metal $H_1$, it would not be required to previously form a clearance angle at the forward end 125a of the cutting edge ridge 125 utilized as an inner peripheral cutting edge, to an increased value, and it would be possible to avoid an occurrence of a so-called relief abutment or impingement. Thus, it would be possible to have a high strength of the insert over the entire length of the cutting edge ridge 125.

In addition, since the corner portion 128 of the upper surface 121, which is diagonally opposed to the corner portion 127 at the forward end portion of the cutting edge ridge 125 and which is located at a rearward end of the cutting edge ridge 124 utilized as an outer peripheral cutting edge, is formed by the similar inclined planar surface, it is possible, as a result, to bring a locus of rotation of each point on the cutting edge ridge 124 utilized as the outer peripheral cutting edge, into conformity with a substantially identical circumference Y. This causes a working surface of a workpiece being cut to further approach a right angle, to thereby make it possible to improve the cutting accuracy. Furthermore, since the corner portions 127 and 128 are both formed by the inclined planar surface and the insert 120 per se is formed into a configuration of a symmetry of revolution through 180 degrees, when one of the cutting edge ridges 124 utilized as the outer peripheral cutting edge is worn off, the insert 120 can be reversed through 180 degrees so that the cutting edge ridge 126 is utilized as an end cutting edge. This enables the cutting edge ridge 125 opposed to the cutting edge ridge 124 to be utilized as an outer peripheral cutting edge. Thus, there is provided a high or superior economy.

FIGS. 19 through 23 show only a cutting insert 130 for use in an end mill in accordance with a fifth embodiment of the present invention, with an end mill substantially identical with that shown in FIGS. 10 and 11 being omitted to avoid duplication. The insert 130 has an upper surface 131 which has a corner portion 134 defined by a cutting edge ridge 132 utilized as an end cutting edge and a cutting edge ridge 133 utilized as an inner peripheral cutting edge when the insert 130 is mounted on the end mill body, and a corner portion 135 diagonally opposed to the corner portion 134. Each of the corner portions 134 and 135 is formed by a convexly curved, inclined surface so that a thickness of the insert 130 between the upper surface 131 and a lower surface 136 is progressively reduced toward the extremity of the corner portion 134, 135.

FIGS. 24 through 28 show only a cutting insert 140 for use in an end mill in accordance with a sixth embodiment of the present invention, with an end mill body substantially identical with that shown in FIGS. 10 and 11 being omitted. The insert 140 is in the form of a plate of a generally square shape having a lower surface 141 utilized as a seating surface. An upper surface 142 of the insert 140 is formed so as to have two inclined planar surface sections 143 and 143, with a single diagonal ridgeline being located therebetween, so that the insert 140 takes a form of a rhombus as viewed in plan. The upper surface 142 has four sides which are formed into cutting edge ridges 144, 145, 146 and 147, respectively. Each of corner portions 148 and 149 of the upper surface 142 with the diagonal ridgeline being positioned therebetween is formed by an inclined planar surface such that a thickness of the insert 140 between the upper and lower surfaces 141 and 142 is progressively reduced toward the extremity of the corner portion 148, 149. When the insert 140 is mounted on the end mill body, the cutting edge ridge 144 or 147 is utilized as an end cutting edge, and the cutting edge ridge 145 or 146 is utilized as an inner or an outer peripheral cutting edge.

It will be readily appreciated that the inserts 130 and 140 in accordance with the fifth and sixth embodiments shown in FIGS. 19 through 23 and FIGS. 24 through 28 can provide unexpected meritorious results similar to those described with reference to the fourth embodiment shown in FIGS. 10 through 18.

FIGS. 29 through 35 show an end mill in accordance with a seventh embodiment of the present invention, which comprises an end mill body 201 having a chip pocket 202 and a core receiving recess 203. The end mill body 201 is substantially similar in structure to the end mill body 21 described with reference to FIGS. 5 and 6 and will not be described here in detail to avoid duplication. A cutting insert, generally designated by the reference numeral 210, is detachably secured to the end mill body 201 by a clamping member 204.

As shown in detail in FIGS. 32 through 35, the insert 210 is in the form of a plate and has a lower surface 212 which forms a seating surface, and an upper surface 213. A generally arcuate, convexly curved outer peripheral cutting edge 215 is formed at a ridgeline of the upper surface 213 located at an outer peripheral side of the end mill body 201. A linearly extending end cutting edge 216 is formed at a ridgeline of the upper surface 213 located adjacent a forward end of the end mill body 201. As shown in FIGS. 29 through 31, the insert 210 is mounted on the end mill body 201 so as to have the end cutting edge 216 spaced from an axis $O_2$ thereof. The insert 210 has an inner peripheral cutting edge 221 formed along a ridgeline of the upper surface 213 located at an inner peripheral side when the insert 210 is mounted on the end mill body 201.

In addition, a groove 222 having a U-shaped cross-section is formed in a central portion of the lower surface 212 of the insert 210 so as to extend along the axis $O_2$ of the end mill body 201. A side wall surface of the groove 222 faced to the inner peripheral cutting edge 221 of the insert 210 forms an abutment surface 223 for receiving a component force of the cutting feed from the outer peripheral cutting edge 215 upon the cutting operation of the end mill. A side wall surface of the groove 222 faced to the abutment surface 223 forms an abutment surface 224 for receiving a component force of the cutting feed from the inner peripheral cutting edge 221 upon the cutting operation of the end mill.

As shown in FIGS. 29 through 31, the insert 210 is detachably secured onto an insert seat of the end mill body 201 located at an outer peripheral side thereof and spaced from the axis $O_2$ of the end mill body 201, such that the outer and inner peripheral cutting edges 215 and 221 are positioned at the outer and inner peripheral sides of the end mill body 201, respectively. The insert 210 is fixed by the engagement of a convex portion or projection 205 formed on the insert seat of the end mill body 201, with the groove 222 formed in the lower surface 212 of the insert 210. Similarly to the end mill body 21 described with reference to FIGS. 5 and 6, the core receiving recess 203 is formed at a center of a forward end face of the end mill body 201 so as to extend a predetermined distance from the forward end face along the axis $O_2$ thereof. The recess 203 is provided for receiving therein a core formed on a workpiece upon the cutting thereof due to the fact that the insert 210 is spaced from the axis $O_2$ of the end mill body 201. The insert 210 is mounted on the end mill body 201 so as to expose the inner peripheral cutting edge 221 of the insert 210 into the core receiving recess 203 in the end mill body 201.

The end mill comprising the end mill body 201 and the insert 210 mounted thereon operates in a manner substantially the same as that in which the end mill described with reference to FIGS. 5 and 6 operates. Moreover, in addition to unexpected meritorious results substantially the same as those obtained by the end mill shown in FIGS. 5 and 6, the end mill shown in FIGS. 29 through 35 can provide such advantages that since the groove 222 is provided in the lower surface 212 of the insert 210 to independently form the abutment surfaces 223 and 224 which respectively receive the component forces of the cutting feed from the respective outer and inner peripheral cutting edges 215 and 221, no shift and play would occur on the insert 210 even if a cutting operation high in cutting load is performed, and it would be possible to have the cutting operation high in accuracy.

FIGS. 36 through 39 show only a cutting insert 230 for use in an end mill in accordance with an eight embodiment of the present invention, with an end mill body substantially identical with that shown in FIGS. 29 through 31 being omitted to avoid duplication. The insert 230 has an upper surface 233 having a pair of ridgelines along which two sets of smoothly, convexly curved outer peripheral cutting edges 235a and 235b, linear end cutting edges 236a and 236b, and inner peripheral cutting edges 241a and 241b are formed in a manner of a symmetry of revolution through 180 degrees. Specifically, when one set of the outer peripheral cutting edge 235a, end cutting edge 236a and inner peripheral cutting edge 241a are worn off due to the cutting operation, the insert 230 is reversed or revolved through 180 degrees so that the other set of the outer peripheral cutting edge 235b, end cutting edge 236b and inner peripheral cutting edge 241b can successively be utilized. A groove 242 having abutment surfaces 243 and 244 similar to the groove 222 of the seventh embodiment shown in FIGS. 32 through 35 is also formed in a central portion of a lower surface 232 of the insert 230.

FIGS. 40 through 48 show an end mill in accordance with a ninth embodiment of the present invention, which comprises an end mill body 301 having a chip pocket 302 and a core receiving recess 303. The end mill body 301 is substantially similar in structure to the end mill body 21 described with reference to FIGS. 5 and 6 and will not be repeatedly described here. A cutting insert, generally designated by the reference numeral 325, is detachably secured to the end mill body 301 by a clamping member 304.

Figure 40:
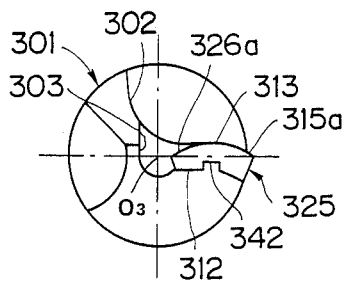
FIG. 40 is a view similar to FIG. 5, but showing a ninth embodiment of the present invention.
Figure 41:
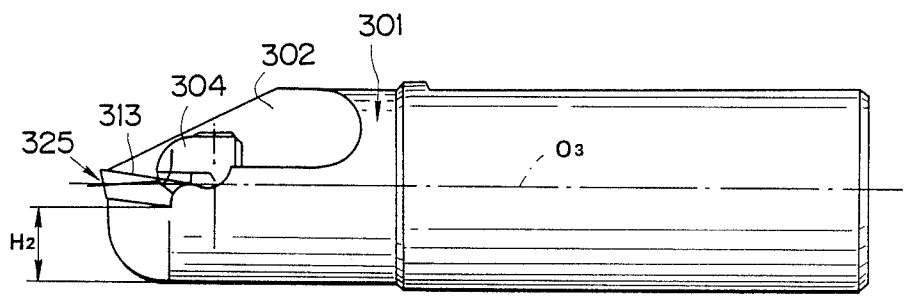
FIG. 41 is a side elevational view of an end mill shown in FIG. 40.
Figure 42:
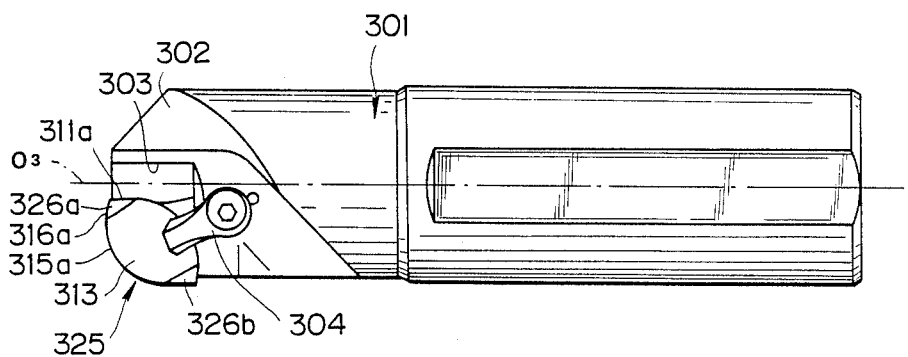
FIG. 42 is a plan view of the end mill shown in FIG. 40.
Figure 43:
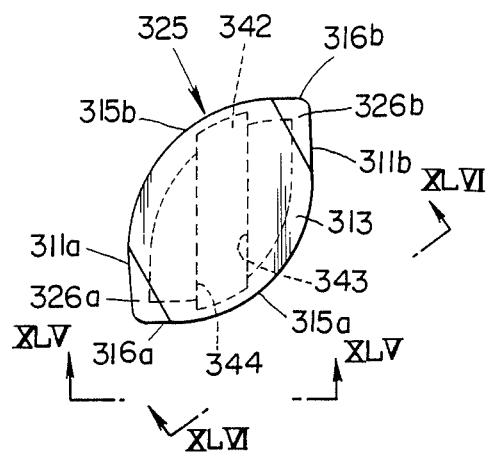
FIG. 43 is a plan view of a cutting insert shown in FIGS. 40 through 42.
Figure 44:
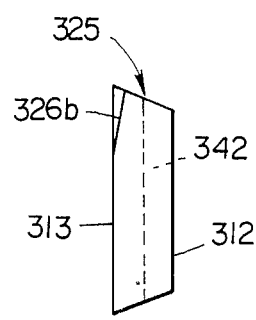
FIG. 44 is a side elevational view of the insert shown in FIG. 43.
Figure 45:
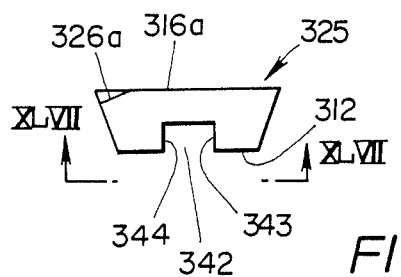
FIG. 45 is a view as seen in the direction indicated by the arrows XLV—XLV in FIG. 43.
Figure 46:
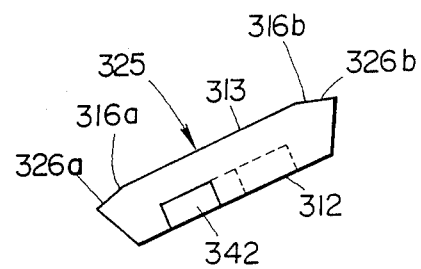
FIG. 46 is a view as seen in the direction indicated by the arrows XLVI—XLVI in FIG. 43.
Figure 47:
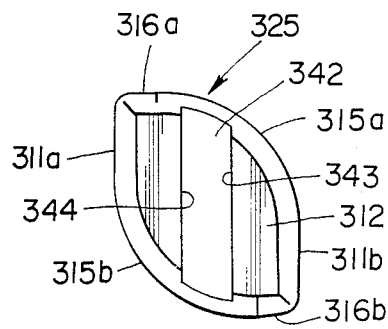
FIG. 47 is a view as seen in the direction indicated by the arrows XLVII—XLVII in FIG. 45.

As shown in FIGS. 43 through 47, the insert 325 is generally similar to the insert 230 shown in FIGS. 36 through 39, but an upper surface 313 additionally has corner portions 326a and 326b which are defined by linear end cutting edges 316a and 316b and inner peripheral cutting edges 311a and 311b, respectively. Each of the corner portions 326a and 326b is formed by an inclined planar surface such that a thickness of the insert 325 between the upper surface 313 and a lower surface 312 is progressively reduced toward the extremity of the corner portion 326a, 326b. A groove 342 having abutment surfaces 343 and 344 similar to the groove 222 of the seventh embodiment shown in FIGS. 32 through 35 is also formed in a central portion of the lower surface 312 of the insert 325. As shown in FIGS. 40 through 42, in use, the insert 325 is mounted on an insert seat on the end mill body 301 so that the upper surface 313 is located at a position above an axis $O_3$ of the end mill body 301.

The inserts 230 and 325 of the respective eighth and ninth embodiments shown in FIGS. 36 through 39 and FIGS. 40 through 47 can provide unexpected meritorious results which are the same as those obtained by the seventh embodiment shown in FIGS. 29 through 35. In addition, the inserts 230 and 325 are further advantageous in that since two sets of smoothly, convexly curved outer peripheral cutting edges 235a and 235b; and 315a and 315b end cutting edges 236a and 236b; and 316a and 316b, and inner peripheral cutting edges 241a and 142b; and 311a and 311b are formed into a symmetrical configuration, when one of the outer peripheral cutting edges 235a, 315a is worn off, the insert 230, 325 is revolved through 180 degrees so that the other outer peripheral cutting edge 235b, 315b and the like opposed to the outer peripheral cutting edge 235a, 315a and the like can be utilized to provide superior economy.

Figure 48:
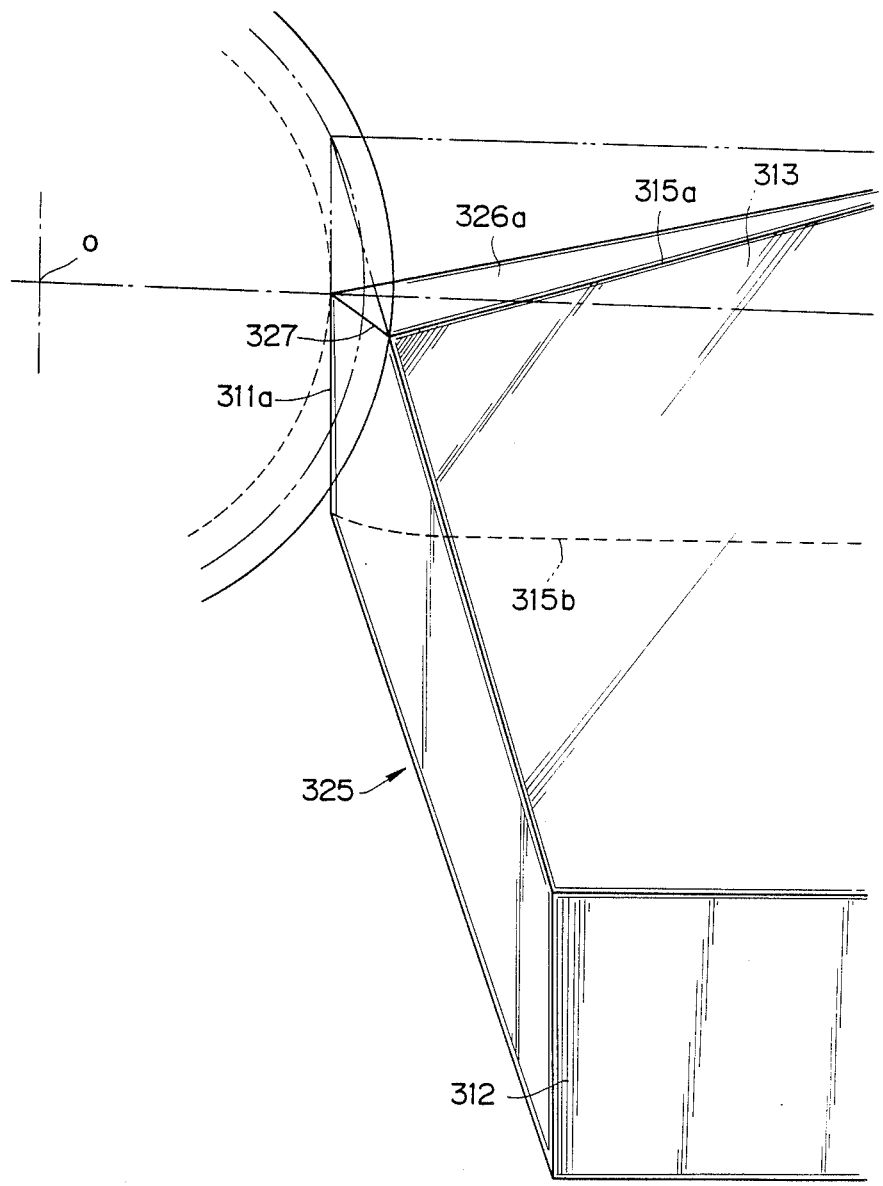
FIG. 48 is a fragmentary perspective view of the insert shown in FIGS. 43 through 47.
Figure 49:
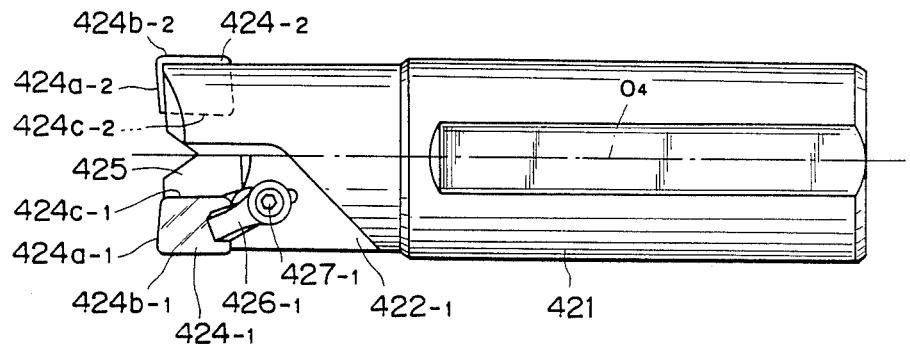
FIG. 49 is a plan view of a tenth embodiment of the present invention.

Moreover, in particular, as shown in FIGS. 40 through 42, even in case where the insert 325 is mounted such that the upper surface 312 is located at a position above the axis $O_3$ of the end mill body 301 and a radial rake angle at the outer peripheral cutting edge 315a is rendered negative, it would be possible to prevent a radial rake angle at a forward end 327 of the inner peripheral cutting edge 311a from being increased in the positive direction as is the case of an insert as indicated by the two-dot-and-chain line in FIG. 48 so that no relief impingement would occur on the flank, since the corner portion 326a adjacent the forward end portion 327 of the inner peripheral cutting edge 311a is formed by the inclined surface. Accordingly, as shown in FIG. 41, it is possible to secure an increased amount of back metal $H_2$ in the end mill body 301, and it is possible to increase a tool rigidity of the end mill body 301.

Although the seventh, eighth and ninth embodiments have been described as being arranged such that each of the inserts 210, 230 and 325 has the groove 222; 242; 342 formed in the lower surface 212; 232; 312, and the side wall surface of the groove form the abutment surfaces 223 and 224; 243 and 244; 343 and 344 for respectively receiving the component forces of the cutting feed from the respective outer and inner peripheral cutting edges 215 and 221; 235a and 235b; 315a and 315b, the present invention should not be limited to these illustrated embodiments. The insert may have formed on the lower surface thereof a convex portion or projection having the above-described abutment surfaces. In this case, the end mill body has formed in the insert seat thereof a concave portion or recess into which the projection is snugly fitted, as is the case of the second embodiment shown in FIG. 8.

FIGS. 49 to 52 show a tenth embodiment of the present invention.

Figure 50:
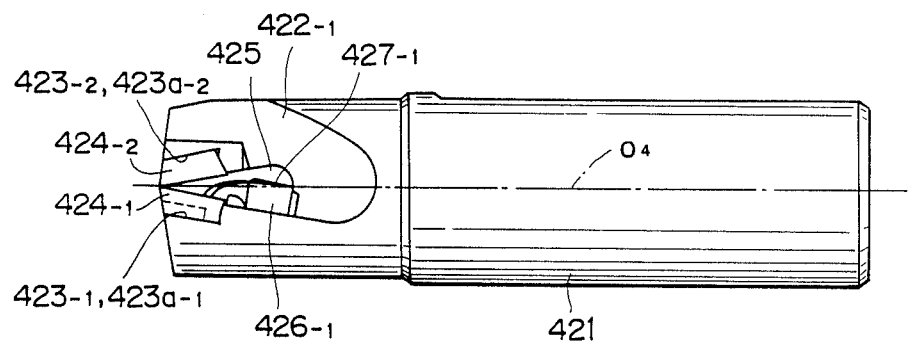
FIG. 50 is a side elevational view of the end mill of FIG. 49.
Figure 51:
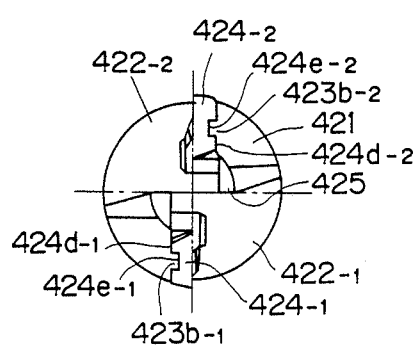
FIG. 51 is a front end view of the end mill of FIG. 49.
Figure 52:
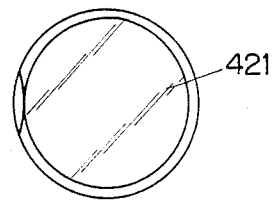
FIG. 52 is a rear end view of the end mill of FIG. 49.
Figure 53:
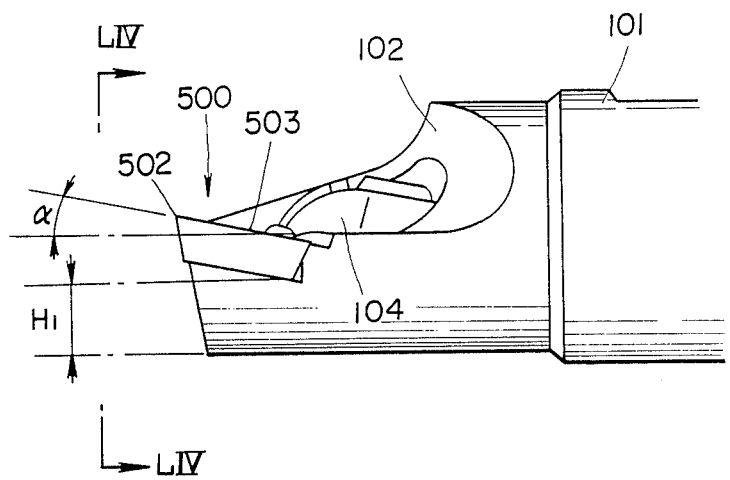
FIG. 53 is a view similar to FIG. 5, but showing an eleventh embodiment of the present invention.
Figure 54:
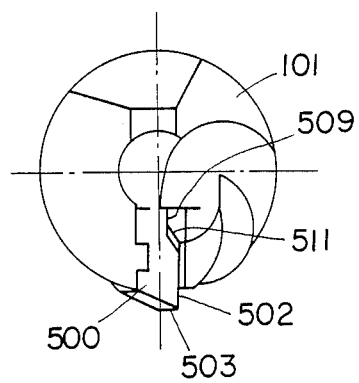
FIG. 54 is a view as seen in the direction indicated by the arrows LIV—LIV in FIG. 53.
Figure 55:
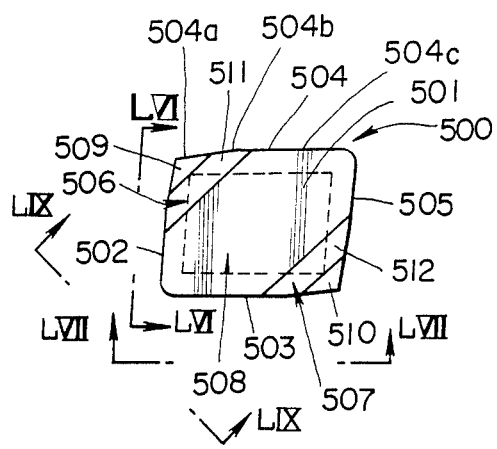
FIG. 55 is a plan view of a cutting insert shown in FIGS. 53 and 54.
Figure 56:
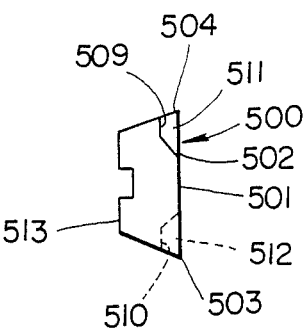
FIG. 56 is a view as seen in the direction indicated by the arrows LVI—LVI in FIG. 55.
Figure 57:
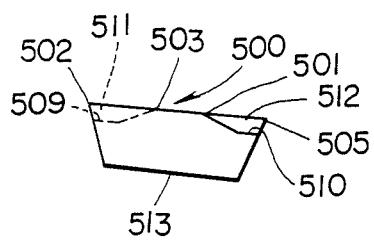
FIG. 57 is a view as seen in the direction indicated by the arrows LVII—LVII in FIG. 55.
Figure 58:
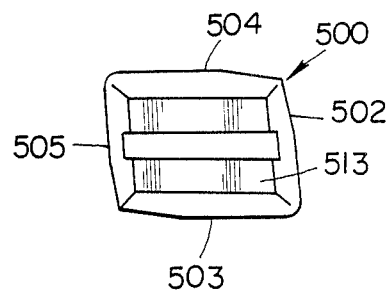
FIG. 58 is a bottom view of the insert shown in FIG. 55.
Figure 59:
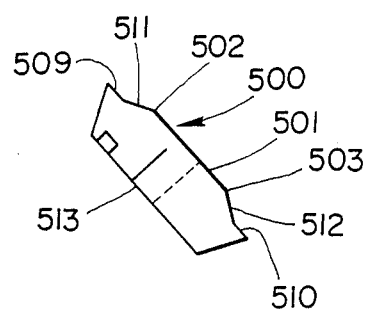
FIG. 59 is a view as seen in the direction indicated by the arrows LIX—LIX in FIG. 55.

This end mill is similar in construction to that shown in FIGS. 10 to 16 but differs therefrom in that a pair of cutting inserts 424-1 and 424-2 are provided at the forward end portion of an end mill body 421 symmetrically with respect to an axis $O_4$ thereof. Forward end portions of the body 421 are cut away to form a pair of chip pockets 422-1 and 422-2 which are also disposed symmetrically with respect to the axis $O_4$ of the body 421. An insert seat 423 in the form of a recess of rectangular cross section is formed in a part of a wall defining each chip pocket 422, the part of the wall facing in the direction of rotation of the end mill. Projections 423b-1 and 423b-2 both extending in the direction of the axis $O_4$ are provided on bottom surfaces 423a-1 and 423a-2 of the insert seats 423-1 and 423-2, respectively. The inserts 424-1 and 424-2 having recesses 424e-1 and 424e-2 complementary to the projections 423b-1 and 423b-2 and formed in their lower surfaces 424d-1 and 424d-2 are fitted to the insert seats 423-1 and 423-2, and fixedly secured thereto by clamping members 426-1 and 426-2, and screws 427-1 and 427-2, respectively. The inserts 424-1 and 424-2 are equally spaced from the axis O₄ of the end mill body 421. Each of the inserts 424-1 and 424-2 has an end cutting edge 424a, an outer peripheral cutting edge 424b and an inner peripheral cutting edge 424c. A radial rake angle of each insert 424 is set to 0 to 5 degrees and an axial rake angle thereof is set to 5 to 10 degrees, although both of the radial rake angles of the inserts 424-1 and 424-2 shown in FIG. 50 are set to 0 degree.

A core receiving recess 425 is formed at a center of the forward end face of the end mill body 421. A distance from the axis O₄ to a wall surface of the core receiving recess 425 is set to a value which is equal to or greater than a distance from the axis O₄ to either one of the inner peripheral ends of the end cutting edges 424a-1 and 424a-2.

With this end mill, the thrust load is distributed to the two end cutting edges, so that no excessive thrust load is exerted on the inner peripheral portions thereof. Thus, it is possible to prevent the inserts from being chipped or fractured. Furthermore, a cross feed cutting is performed by the inner and outer peripheral cutting edges of both of the inserts, and therefore this end mill can withstand an increased cutting load, so that a higher speed cutting operation can be achieved.

With the embodiment shown in FIGS. 49 to 52, only two inserts are mounted, however, it will be apparent that the end mill can be easily modified to have more than two (for example, four)inserts disposed symmetrically with respect to the axis of the end mill body. It is also possible to modify the end mill so as to mount any ones of the inserts (for example, the inserts 210 shown in FIGS. 32 to 35) of the aforesaid embodiments.

Figure 60:
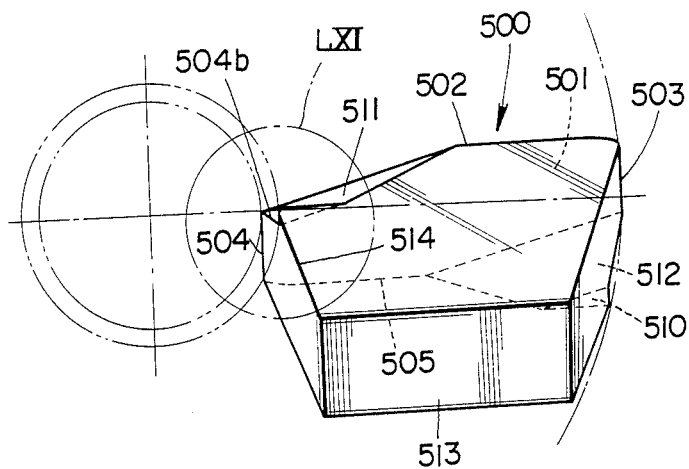
FIG. 60 is an enlarged fragmentary perspective view showing an attached condition of the insert shown in FIG. 55.
Figure 61:
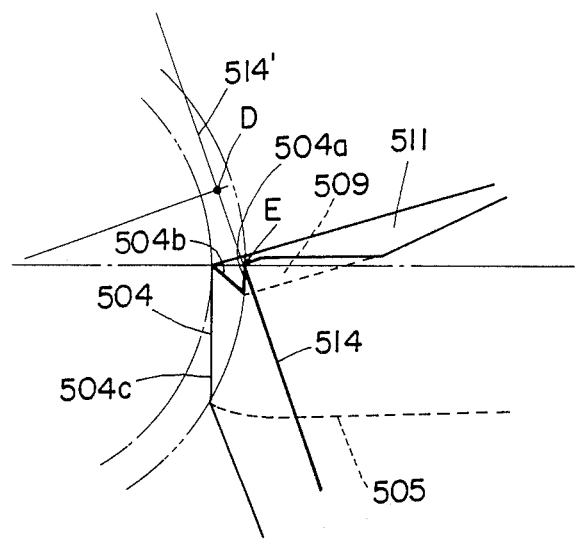
FIG. 61 is an enlarged fragmentary perspective view of a portion encircled by the character LXI in FIG. 60.

Further, FIGS. 53 to 61 show an end mill in accordance with an eleventh embodiment of the present invention which differs from the end mill shown in FIGS. 10 to 18 in that a modified cutting insert 500 is employed. The insert 500 is comprised of a parallelogrammic plate including an upper surface 501 having four cutting edges 502, 503, 504 and 505. The upper surface 501 is composed of an opposed pair of corner portions 506 and 507 and a central portion 508 disposed between the corner portions 506 and 507, and each of the corner portions 506 and 507 is further composed of a first surface 509, 510 which includes a respective obtuse corner and a second surface 511, 512 disposed between the first surface 509, 510 and the central portion 508. The central portion 508 is disposed so as to be generally parallel to a lower surface 513, and each of the second surfaces 511 and 512 of the corner portions 506 and 507 is inclined with respect to the central portion 508 in such a manner that a thickness of the insert 500 between the upper and lower surfaces 501 and 513 is progressively reduced from the central portion 508 toward a respective obtuse corner while each of the first surfaces 509 and 510 is generally parallel to the central portion 508 and the lower surface 513. Thus, the cutting edge ridge 504 serving as an inner peripheral cutting edge is composed of a first edge portion 504a defined by a marginal ridgeline of the first surface 509, a second edge portion 504b defined by a marginal ridgeline of the second surface 511 of the corner portion 506 and a third edge portion 504c defined by a marginal ridgeline of the central portion 508, and the cutting edge ridge 504 is disposed in a specific manner as shown in FIGS. 60 and 61. Namely, suppose a line 514' on which a corner ridge 514 lies, and a point D at which the line 514' and a line extending radially outwardly from the axis of the body cross at right angles. Then, the foremost end of the cutting edge 504, as designated at E, is disposed so as to be farther from the axis than the point D is. In addition, the third edge portion 504c is disposed so as to extend radially outwardly of the body as well as in the direction opposite to the direction of rotation of the body from that point where the second and third edge portions 504b and 504c intersect with each other. Accordingly, as is the case with the end mill shown in FIGS. 10 to 18, the relief abutment of the flank for the foremost end portion of the cutting edge 504 is prevented without increasing its relief angle, so that the cutting edge 504 exhibits an increased strength over the entire length thereof. Also, since the diagonally opposed obtuse corners have a structural configuration similar to each other, the insert 500 can be reversed to index the cutting edge 504 which has served as the inner peripheral cutting edge into the outer peripheral cutting position.

Moreover, the first surface 509, 510 of each corner portion 506, 507 is disposed so as to be generally parallel to the lower surface 513, the insert 500 has sufficient thicknesses at portions adjacent the obtuse corners, and therefore the portions adjacent the obtuse corners are not susceptible to fracture or chipping. Accordingly, the end mill exhibits more excellent durability than the end mill shown in FIGS. 10 to 18 does, and hence can be successfully employed even for heavy-duty use.

Figure 62:
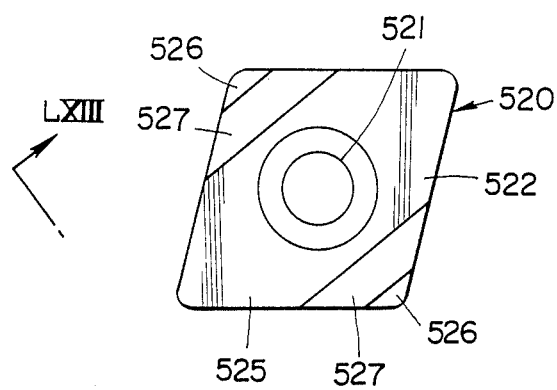
FIG. 62 is a plan view showing a cutting insert used in a twelfth embodiment of the present invention, with an end mill body being omitted.
Figure 63:
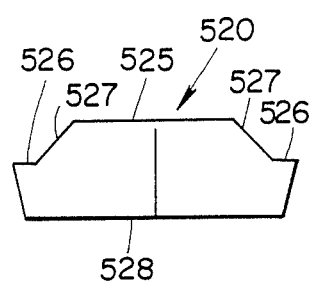
FIG. 63 is a view as seen in the direction indicated by the arrows LXIII—LXIII in FIG. 62.

FIGS. 62 and 63 show a cutting insert 520 employed in a twelfth embodiment of the present invention which insert differs from the insert shown in FIGS. 55 to 59 in that the insert 520 is comprised of a rhombic plate having a central bore 521 formed therethrough. An upper surface 522 of the insert 520 includes a diagonally opposed pair of corner portions 523 and 524 and a central portion 525 disposed between the corner portions 523 and 524, and each of the corner portions 523 and 524 is composed of a first surface 526 disposed at a respective obtuse corner and extending generally in parallel with a lower surface 528, and a second surface 527 disposed between the first surface 526 and the central portion 525 so as to be inclined with respect to the central portion 525. With this structure, the insert 520 has the same advantages as the insert shown in FIGS. 55 to 59 has.

Figure 64:
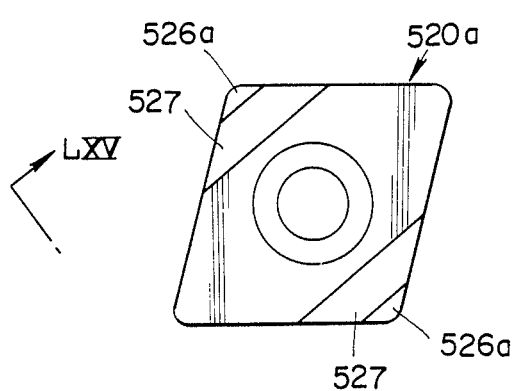
FIG. 64 is a plan view showing a cutting insert used in a thirteenth embodiment of the present invention, with an end mill body being omitted.
Figure 65:
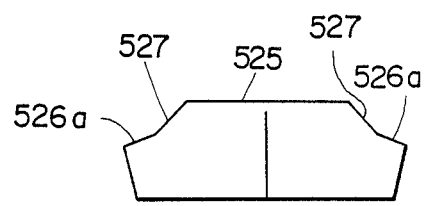
FIG. 65 is a view as seen in the direction indicated by the arrows LXV—LXV in FIG. 64.

FIGS. 64 and 65 show a cutting insert 520a employed in a thirteenth embodiment of the present invention which insert differs from the insert of FIGS. 62 and 63 only in that each first surface 526a is inclined with respect to the second surface 527 in such a manner that an angle defined by the central portion 525 and a plane on which the first surface 526 lies is greater than an angle defined by the second surface 527 and the central portion 525.

As described above, an end mill in accordance with the present invention comprises a cutting insert mounted on a forward end of an end mill body in spaced relation to an axis of the end mill body. First one of cutting edge ridges of the insert, which is located adjacent the forward end of the end mill body and extends from an outer peripheral side of the end mill body toward an inner peripheral side thereof, forms an end cutting edge. The cutting edge ridges of the insert, which respectively extend from outer and inner peripheral ends of the end cutting edge toward a rearward end of the end mill body, form an outer peripheral cutting edge and an inner peripheral cutting edges, respectively.

Since the insert is spaced from the axis of the end mill body, the inner peripheral end of the end cutting edge and the inner peripheral cutting edge extending from the inner peripheral end of the end cutting edge are also spaced from the axis of the end mill body. Consequently, the inner peripheral end of the end cutting edge and the inner peripheral cutting edge have a relatively high cutting speed, and no excessive thrust load is exerted on the inner peripheral end of the end cutting edge. Thus, it is possible to prevent the insert, in particular, the end cutting edge thereof from being chipped or fractured. In addition, even in case of the end mill having a larger diameter, it is possible to utilize a cutting insert of a small size without the use of a cutting insert of a large size, by increasing a distance between the axis of the end mill body to the insert.

Moreover, although the arrangement, in which the inner peripheral end of the end cutting edge is spaced from the axis of the end mill body, would cause a columnar core to be formed at a center of rotation on a workpiece being cut, the end mill in accordance with the present invention comprises a core receiving recess formed at a center of a forward end face of the end mill body so as to have a size equal to or greater than the distance from the axis of the end mill body to the insert, so that the core is grown within the core receiving recess. The core is cut away by the inner peripheral cutting edge of the insert when a cross feed cutting is performed by the end mill.

Furthermore, an end mill in accordance with each of the fourth, fifth and sixth embodiments of the invention shown respectively in FIGS. 10 through 18, FIGS. 19 through 23 and FIGS. 24 through 28, comprises a cutting insert which has an upper surface thereof having a first corner portion defined by a cutting edge ridge utilized as an end cutting edge when the insert is mounted on an end mill body and a second cutting edge ridge utilized as an inner peripheral cutting edge, and a corner portion diagonally opposed to the first corner portion. Each of the corner portions is formed by an inclined surface such that a thickness of the insert between the upper and lower surfaces thereof is progressively reduced from a central portion of the upper surface toward the extremity of the corner portion. With the end mill having the insert configured as described above, when the insert is mounted on the end mill body so as to have a positive axial rake angle, it is possible to secure a high amount of back metal in the end mill body without the decrease in strength of the insert nose, to thereby provide a high cutting performance. In addition, when the insert is to be mounted on the end mill body, the cutting edge ridge utilized as an outer peripheral cutting edge and the cutting edge utilized as an inner peripheral cutting edge are interchangeable to and from each other. This enables superior economy to be achieved. Further, it is possible to bring a locus of rotation of each point on the cutting edge ridge utilized as an outer peripheral cutting edge into conformity with a generally identical circumference. This enables high cutting accuracy to be achieved.

Furthermore, in an end mill in accordance with each of the twelfth, eleventh and thirteenth embodiments of the invention shown respectively in FIGS. 53 to 61, FIGS. 62 and 63 and FIGS. 64 and 65, an upper surface of a cutting insert has an opposed pair of corner portions each comprised of a first surface which includes a respective corner and a second surface which is inclined similarly to the inclined corner portion of the insert in the fourth, fifth and sixth embodiments of the invention, and the first surface is inclined with respect to the second surface in such a manner that an inclination angle defined by the first surface and the central portion is greater than an inclination angle defined by the second surface and the central portion. Accordingly, in addition to the same advantages as the fourth, fifth and sixth embodiments, the above end mill further has the advantage that the obtuse corners of the insert are more durable, thereby permitting the end mill to be employed under more severe cutting conditions.

Additionally, an end mill in accordance with each of the seventh, eighth and ninth embodiments shown respectively in FIGS. 29 through 35, FIGS. 36 through 39 and FIGS. 40 through 48, comprises a cutting insert in which a smoothly, convexly curved outer peripheral cutting edge is formed by a cutting edge ridge of an upper surface of the insert located at an outer peripheral side of an end mill body, and an inner peripheral cutting edge is formed by a cutting edge ridge of the upper surface located at an inner peripheral side of the end mill body. Abutment surfaces against the end mill body, which respectively receive component forces of the cutting feed from the respective outer and inner peripheral cutting edges, are respectively formed at locations other than the upper surface of the insert. Thus, it is possible to perform the cross feed and axial cuttings with only a single insert. In addition, should the end mill body have an increased diameter, it would not be required to increase the size of the insert, to thereby provide superior economy.

What is claimed is:

1. An end mill comprising:
an end mill body having an axis of rotation therethrough and having forward and rearward end portions, said forward end portion having a core receiving recess formed at a center of an end face thereof; and
a cutting insert comprising a plate defined by an upper surface, a lower surface and side faces joining said upper and lower surfaces, said upper surface having a first cutting edge ridge, a second cutting edge ridge intersecting at one end thereof with said first cutting edge ridge and a third cutting edge ridge intersecting with said second cutting edge ridge at the other end thereof, said upper surface having a corner where said second cutting edge ridge and said third cutting edge ridge intersect with each other, said insert having a corner ridge defined by an adjacent pair of said side faces and extending from said corner, said upper surface being composed of a central portion and a corner portion which includes said corner, whereby said third cutting edge ridge is composed of a first edge portion defined by a marginal ridge of said corner portion and a second edge portion defined by a marginal ridge of said central portion, said first edge portion being disposed so that a distance between the axis and a point B located on the outermost radial end of said first edge portion is longer than a distance between the axis and a point A located on a radius of said body, whereby relief impingement of a relief surface for said first edge portion is prevented, at least that portion of said corner portion disposed adjacent to said central portion being inclined in such a manner that the thickness of said insert between said lower and upper surfaces thereof is progressively reduced from said central portion toward said corner;

said insert being releasably mounted of said forward end portion of said body in such a manner that said first cutting edge ridge is located so as to protrude radially outwardly from an outer periphery of said forward end portion to serve as an outer peripheral cutting edge, that said second cutting edge ridge is located so as to protrude forwardly from the end face of said forward end portion to serve as an end cutting edge, that said third cutting edge ridge is located so as to protrude radially inwardly of the body into said core receiving recess to serve as an inner peripheral cutting edge, and that the insert has a negative radial rake angle at said outer peripheral cutting edge and a positive rake angle, said third cutting edge ridge being located so that said second edge portion thereof extends radially outwardly of said body as well as in a direction opposite to the direction of rotation of said body from that point of said third cutting edge ridge where said first and second edge portions intersect with each other, and that a distance between said corner and said axis of said body is longer than a distance between said axis and a point at which a line extending radially outwardly of the body from the axis and a line on which said corner ridge lies cross at right angles.

2. The end mill as claimed in claim 1 in which said upper surface of said insert is said inclined surface inclined in such a manner that the thickness of said insert between said lower and upper surfaces thereof is progressively reduced from said central portion towards said corner.

3. An end mill according to claim 2 in which said corner portion of the upper surface of said insert has an inner peripheral cutting edge and is planar so that said first edge portion of the inner peripheral cutting edge is straight.

4. An end mill according to claim 2, in which said corner portion of the upper surface of said insert is convexly curved so that said first edge portion of the inner peripheral cutting edge is convexly curved.

5. An end mill according to claim 1, in which said corner portion of the upper surface of said insert is composed of a first surface which includes said corner and a second surface disposed between said first surface and said central portion, said second surface being inclined in such a manner that the thickness of said insert between said lower and upper surfaces thereof is progressively reduced toward said corner.

6. An end mill according to claim 5, in which said first surface of the corner portion of the upper surface of said insert is inclined with respect to said second surface in such a manner that said first surface and said central portion extend generally in parallel with each other.

7. An end mill according to claim 5, in which said first surface of the corner portion of the upper surface of said insert is inclined with respect to said second surface in such a manner that an angle defined by said central portion and a plane on which said first surface lies is larger than an angle defined by said central portion and said second surface.

8. An end mill according to claim 1, in which said forward end has at least one pocket formed therein and opening to both an outer periphery thereof and said end face, said pocket including an insert receiving recess having a bottom face facing in the direction of rotation of the body, said insert being releasably mounted in said insert receiving recess with said lower surface held in contact with said bottom face of said insert receiving recess; and further comprising shift preventing means for preventing said insert from being shifted during a cutting operation of the end mill, said shift preventing means comprising an engaging recess formed in one of the bottom face of the insert receiving recess and the lower surface of the insert and extending axially of the body and a projection complementary to said engaging recess of the shift preventing means and formed on the other of the bottom face of the insert receiving recess and the lower surface of the insert so as to be brought into engagement with said engaging recess of the shift preventing means.

9. A cutting insert for releasably mounted on a forward end portion of a body of an end mill, said body having an axis of rotation and having a core receiving recess formed at a center of an end face of the forward end portion thereof, comprising a plate having an upper surface, a lower surface and side faces joining said upper and lower surfaces, said upper surface having a first cutting edge ridge serving as an outer peripheral cutting edge, a second cutting edge ridge intersecting at one end thereof with said first cutting edge ridge and serving as an end cutting edge, and a third cutting edge ridge intersecting with said second cutting edge ridge at the other end thereof and serving as an inner peripheral cutting edge, said upper surface having a corner where said second cutting edge ridge and said third cutting edge ridge intersect with each other, said insert having a corner ridge defined by an adjacent pair of said side faces and extending from said corner, said upper surface being composed of a central portion and a corner portion which includes said corner, whereby said third cutting edge ridge is composed of a first edge portion defined by a marginal ridge of said corner portion and a second edge portion defined by a marginal ridge of said central portion, at least that portion of said corner portion disposed adjacent to said central portion being inclined in such a manner that a thickness of the insert between said upper and lower surfaces is progressively reduced from said central portion toward said corner, said insert being disposed so as to have a negative radial rake at said first cutting edge ridge and a positive axial rake, said third cutting edge ridge being located so that said second edge portion thereof extends radially outwardly of said body as well as in a direction opposite to the direction of rotation of said body from that point of said third cutting edge where said first and second edge portions intersect with each other, and that a distance between said corner and said axis of said body is longer than a distance between said axis and a point at which a line extending radially outwardly of the body from the axis and a line on which said corner ridge lies cross at right angles.

10. A cutting insert according to claim 9, said corner portion of the upper surface of said insert is composed of a first surface which includes said corner and a second surface disposed between said first surface and said central portion, said second surface being inclined in such a manner that the thickness of the insert between said lower and upper surfaces is progressively reduced toward said corner.

11. A cutting insert according to claim 10, in which said upper surface is of a generally quadrilateral shape and has first and second opposed pairs of cutting edges, said upper surface having a pair of corners each defined by a respective one of said first pair of cutting edges and a respective one of said second pair of cutting edges, said upper surface being composed of a pair of corner portions each of which includes a respective one of said corners, and said central portion disposed between said corner portions, each corner portion being composed of said first and second surfaces.

12. A cutting insert according to claim 11, in which said first surface of the corner portion of the upper surface is inclined with respect to said second surface in such a manner that said first surface and said central portion extend generally in parallel with each other.

13. A cutting insert according to claim 11, in which said first surface of the corner portion of the upper surface is inclined with respect to said second surface in such a manner that an angle defined by said central portion and a plane on which said first surface lies is larger than an angle defined by said central portion and said second surface.

* * * * *

UNITED STATES PATENT AND TRADEMARK OFFICE
CERTIFICATE OF CORRECTION

PATENT NO. : 4,808,045

DATED : February 28, 1989

INVENTOR(S) : TSUJIMURA, Osamu

It is certified that error appears in the above-identified patent and that said Letters Patent is hereby corrected as shown below:

ON THE FIRST INFORMATION PAGE:

Please change:

"(21) Appl. No.: 266,339"    to

---(21) Appln. No.: 066,339--.

Signed and Sealed this

Thirty-first Day of October, 1989

Attest:

DONALD J. QUIGG

Attesting Officer

Commissioner of Patents and Trademarks